US009429149B2

(12) United States Patent
Haug

(10) Patent No.: US 9,429,149 B2
(45) Date of Patent: Aug. 30, 2016

(54) POLYETHERIMIDE PUMP

(71) Applicant: SABIC Global Technologies B.V., Bergen op Zoom (NE)

(72) Inventor: Peter Haug, Calw (DE)

(73) Assignee: SABIC Global Technologies B.V., Bergen op Zoom (NL)

( * ) Notice: Subject to any disclaimer, the term of this patent is extended or adjusted under 35 U.S.C. 154(b) by 114 days.

(21) Appl. No.: 13/842,517

(22) Filed: Mar. 15, 2013

(65) Prior Publication Data

US 2014/0010697 A1    Jan. 9, 2014

Related U.S. Application Data

(60) Provisional application No. 61/647,241, filed on May 15, 2012.

(51) Int. Cl.
| | |
|---|---|
| *F04C 2/00* | (2006.01) |
| *F04B 19/20* | (2006.01) |
| *F01C 21/10* | (2006.01) |
| *F04C 2/344* | (2006.01) |
| *F04C 14/22* | (2006.01) |

(52) U.S. Cl.
CPC ............ *F04B 19/20* (2013.01); *F01C 21/10* (2013.01); *F04C 2/3447* (2013.01); *F04C 14/226* (2013.01); *F05C 2225/08* (2013.01); *F05C 2225/10* (2013.01); *F05C 2225/12* (2013.01); *Y10T 29/49236* (2015.01)

(58) Field of Classification Search
CPC ..................... F04C 2/344–2/3447; F05C 2225/00–2225/12
USPC ................................ 418/56, 152, 179, 259; 29/888.02–888.025
See application file for complete search history.

(56) References Cited

U.S. PATENT DOCUMENTS

| | | | | |
|---|---|---|---|---|
| 2,657,638 | A | * | 11/1953 | English .......................... 418/173 |
| 2,868,442 | A | | 1/1959 | Nilsson |
| 3,859,014 | A | * | 1/1975 | Dworak et al. ................ 418/135 |
| 3,918,838 | A | | 11/1975 | Moody, Jr. et al. |
| 5,011,389 | A | * | 4/1991 | Timuska .................. F01C 1/084 |
| | | | | 418/152 |
| 5,078,467 | A | * | 1/1992 | Blomgren et al. ............... 385/56 |
| 5,219,499 | A | * | 6/1993 | Timuska ............... B29C 37/005 |
| | | | | 264/112 |
| 6,001,957 | A | * | 12/1999 | Puyenbroek et al. ......... 528/332 |
| 6,006,542 | A | | 12/1999 | Tojo et al. |
| 6,572,502 | B1 | * | 6/2003 | Young et al. .................. 474/111 |

(Continued)

FOREIGN PATENT DOCUMENTS

| | | | |
|---|---|---|---|
| CA | 2356718 | A1 | 3/2002 |
| CN | 201865976 | U * | 6/2011 |

(Continued)

OTHER PUBLICATIONS

Search Report Dated Oct. 25, 2011.

(Continued)

*Primary Examiner* — Thomas Denion
*Assistant Examiner* — Laert Dounis
(74) *Attorney, Agent, or Firm* — Baker Hostetler LLP

(57) ABSTRACT

A positive displacement pump and methods of making a positive displacement pump having a component, the component having a density ranging from more than 0 to 3 g/cm$^3$, a glass transition temperature (Tg) greater than or equal to 150° C., and a yield strength retention greater than 90% after soaking in engine oil for 7 days at 150° C.

28 Claims, 10 Drawing Sheets

(56) References Cited

U.S. PATENT DOCUMENTS

| | | | |
|---|---|---|---|
| 6,821,099 B2* | 11/2004 | Wilk et al. | ............. 418/259 |
| 2002/0098100 A1 | 7/2002 | Mori et al. | |
| 2002/0141894 A1* | 10/2002 | Kirtley | ............ F01C 21/0809 418/152 |
| 2004/0028547 A1 | 2/2004 | Wilk et al. | |
| 2010/0326236 A1 | 12/2010 | Aisenbrey | |
| 2011/0206880 A1 | 8/2011 | Wang et al. | |
| 2014/0010679 A1 | 1/2014 | Rice et al. | |

FOREIGN PATENT DOCUMENTS

| | | | |
|---|---|---|---|
| DE | 102008024307 | | 1/2009 |
| EP | 1701039 A1 | | 9/2006 |
| EP | 1980752 A2 | | 10/2008 |
| GB | 560591 A | * | 4/1944 ............ F04C 18/084 |
| GB | 2214512 A | | 11/1992 |
| JP | 01182585 A | * | 7/1989 ................ F04C 2/10 |
| JP | 05245966 | | 9/1993 |
| JP | 2005188399 | | 7/2005 |
| JP | 2007192242 | | 8/2007 |
| JP | 2010095615 | | 4/2010 |
| JP | 2011057798 | | 3/2011 |
| WO | WO 86/05555 | | 9/1986 |
| WO | 2004109110 A1 | | 12/2004 |

OTHER PUBLICATIONS

Engineering and High Performance Plastics Market Report; p. 77. New Thermoset Can Replace Engineering Thermoplastics.

International Search Report for International Application No. PCT/IB2013/053717; International Filing Date May 8, 2013; Date of Mailing Sep. 25, 2013; 5 pages.

Written Opinion for International Application No. PCT/IB2013/053717; International Filing Date May 8, 2013; Date of Mailing Sep. 25, 2013; 6 pages.

* cited by examiner

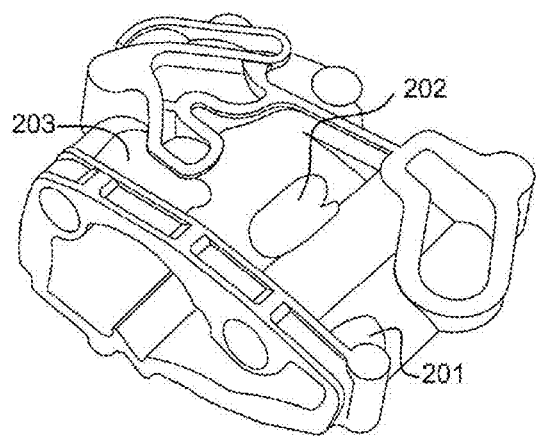
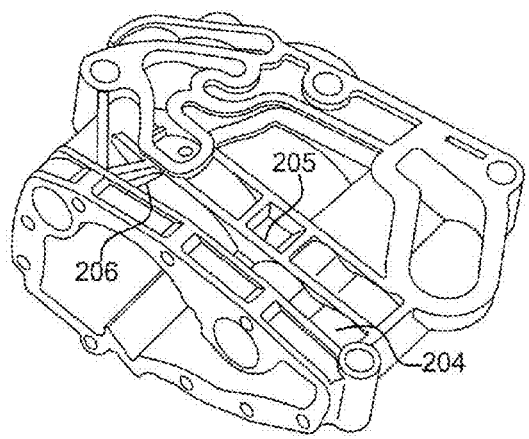
FIG. 2A     FIG. 2B
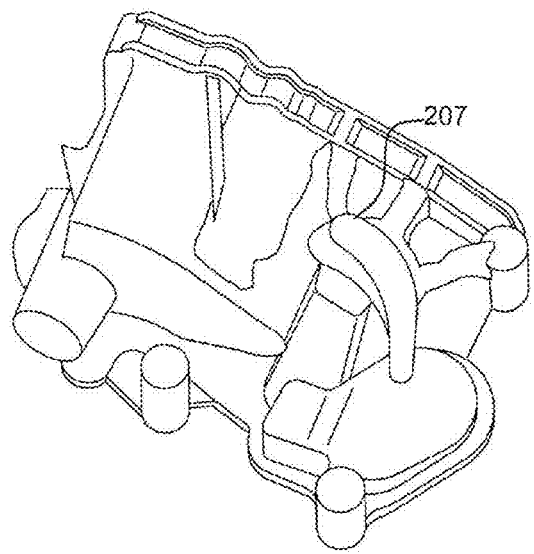
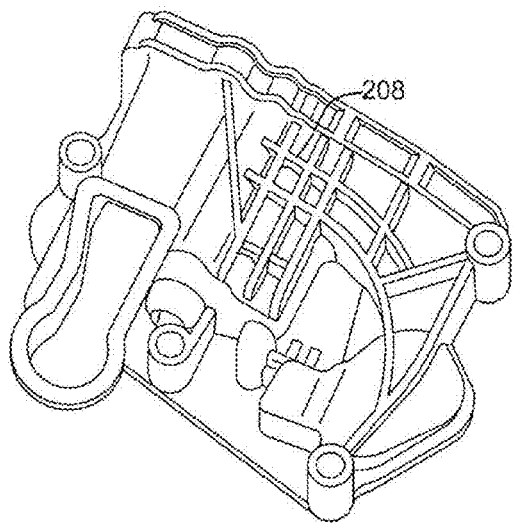
FIG. 2C     FIG. 2D

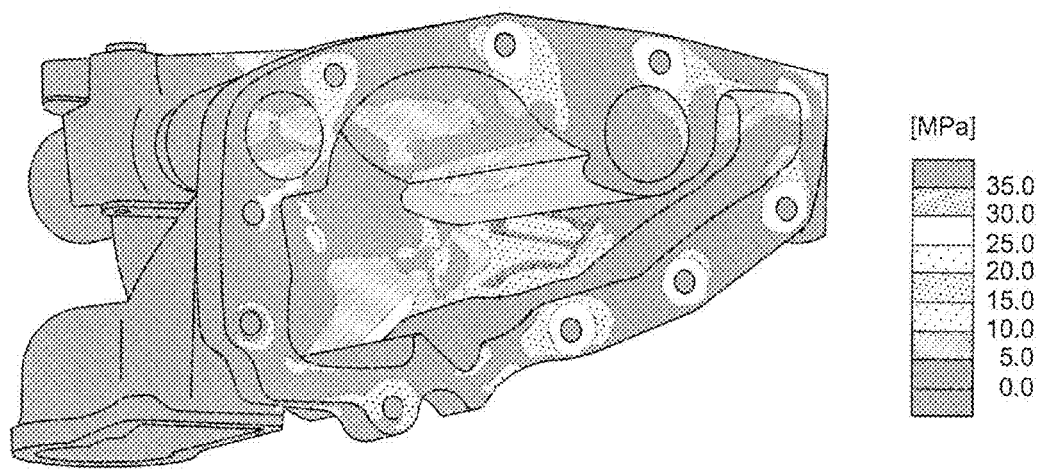
FIG. 2E  Load Case: 7 bar working pressure. 160°C
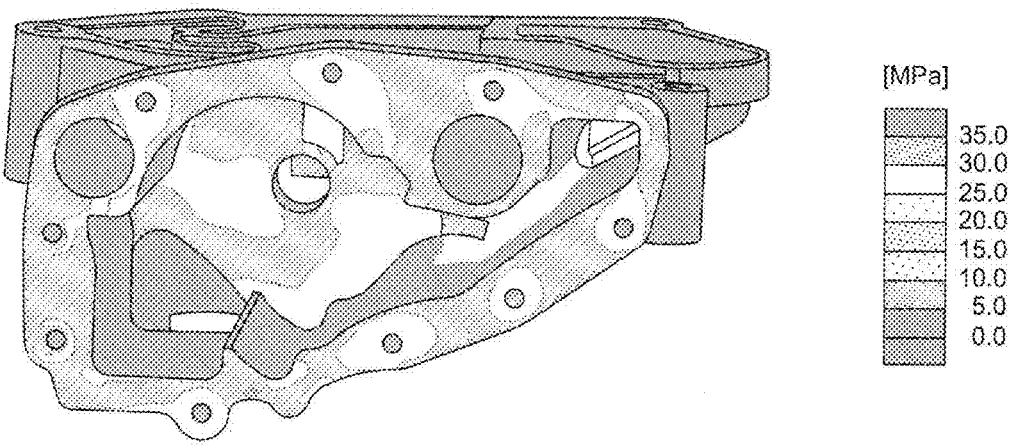
FIG. 2F  Load Case: 7 bar working pressure. 160°C Load Case: 7 bar working pressure, 160°C Load Case: 7 bar working pressure, 160°C

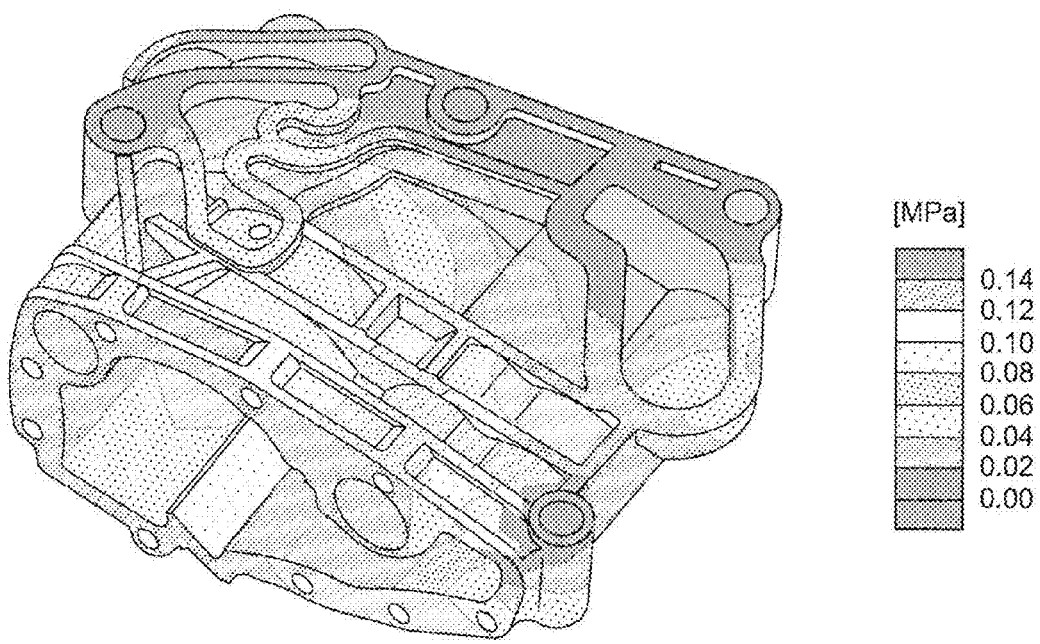
FIG. 2I  Load Case: 7 bar working pressure, 160°C
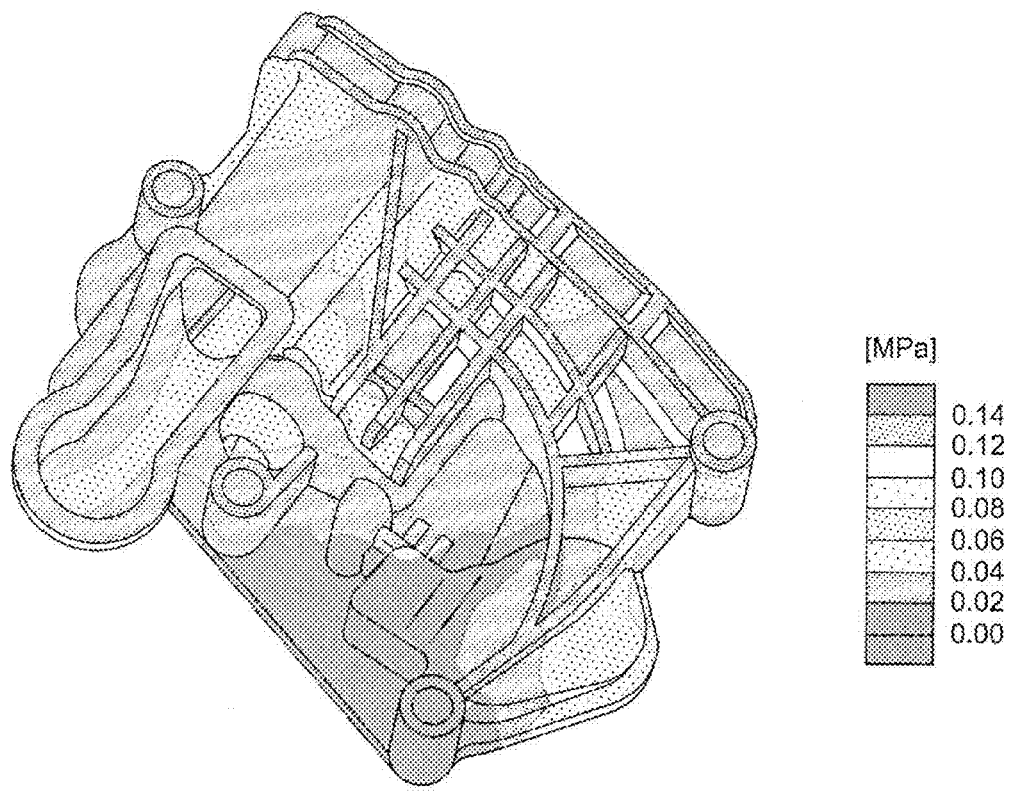
FIG. 2J  Load Case: 7 bar working pressure, 160°C

POLYETHERIMIDE PUMP

BACKGROUND OF THE INVENTION

The invention relates generally to positive displacement pumps and more specifically to positive displacement pumps comprising at least one polymeric component with improved properties.

BRIEF SUMMARY OF THE INVENTION

One embodiment relates to a positive displacement pump comprising a polymeric component, having a density ranging from more than 0 to 3 g/cm$^3$, a glass transition temperature (Tg) greater than or equal to 150° C., and a yield strength retention greater than 90% after soaking in engine oil for 7 days at 150° C.

Another embodiment relates to a method of making a positive displacement pump for pumping liquids. The pump comprising a housing defining an inlet and an outlet, a rotor operatively positioned between the inlet and the outlet, the rotor having means for displacing a liquid between the inlet and the outlet, wherein the method comprises forming at least one component of the pump from a polymeric component, such as a polyetherimide.

Another embodiment relates to a positive displacement pump comprising a polymeric component, wherein the component has a density ranging from more than 0 to 3 g/cm$^3$, wherein the component has a glass transition temperature (Tg) greater than or equal to 150° C., and wherein the component has a yield strength retention greater than 90% after soaking in engine oil for 7 days at 150° C.; wherein the polymeric component comprises a member selected from the group of polyetherimide homopolymers, polyetherimide copolymers, and combinations thereof; wherein the component is a rotor operatively positioned between an inlet and an outlet, wherein the inlet and the outlet are defined by a housing, and wherein the rotor comprises a displacement component for displacing a liquid between the inlet and the outlet, wherein the displacing component is one selected from the group consisting of a vane, a gear, and a trachoid.

BRIEF DESCRIPTION OF THE DRAWINGS

These and other features, aspects, and advantages of the present invention will become better understood with reference to the following description and appended claims, and accompanying drawings where:

FIGS. 2A-J illustrates a computer-rendered schematics, illustrating the use of simplified Pro/E Mechanical Strength Calculations in redesigning the plastic roller cell pump;

Figure 1A:
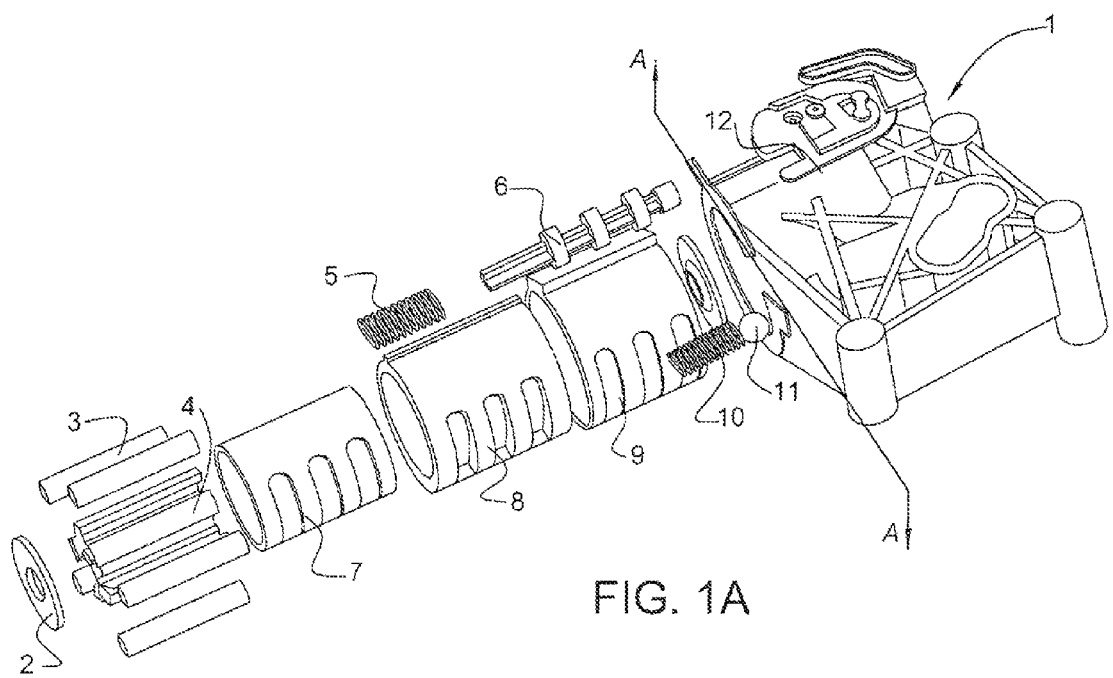
FIG. 1A shows a schematic of a variable roller cell oil pump 1 was made of polyetherimide, commercially available under the brand Ultem® 2300 resin for application in engines, e.g., passenger car engines.

It should be understood that the various embodiments are not limited to the arrangements and instrumentality shown in the drawings.

DETAILED DESCRIPTION OF THE INVENTION

The invention is based on the discovery that by using a specific type of polymer, it is now possible to make a positive displacement pump having a polymer component that has improved properties over metal components, e.g. improved density. The polymer component has a very useful glass transition temperature (Tg), e.g., greater than or equal to 150° C. and useful yield strength retention properties after soaking in engine oil for several days at high temperatures.

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

A first embodiment relates to a positive displacement pump comprising a polymeric component. The pump is a roller vane pump, a vane pump, a gear pump, or a trachoid pump.

The polymeric component can have a density ranging from within a range having a lower limit and/or an upper limit. The range can include or exclude the lower limit and/or the upper limit. The lower limit and/or upper limit can be selected from greater than 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9 and 10 g/cm$^3$. For example, according to certain preferred embodiments, the component can have a density ranging from more than 0 to 3 g/cm$^3$.

The component can have a glass transition temperature (Tg) within a range having a lower limit and/or an upper limit. The range can include or exclude the lower limit and/or the upper limit. The lower limit and/or upper limit can be selected from 130, 135, 140, 145, 150, 155, 160, 165, 170, 175, 180, 185, 190, 195 and 200° C. For example, according to certain preferred embodiments, the component can have a glass transition temperature (Tg) greater than or equal to 150° C.

The component can have a yield strength retention greater than 90% after soaking in engine oil for 7 days within a range having a lower limit and/or an upper limit. The range can include or exclude the lower limit and/or the upper limit. The lower limit and/or upper limit can be selected from 130, 135, 140, 145, 150, 155, 160, 165, 170, 175, 180, 185, 190, 195 and 200° C. For example, according to certain preferred embodiments, the component can have a yield strength retention greater than 90% after soaking in engine oil for 7 days at 150° C.

The component can have an Izod unnotched (80*10*4 at +23° C. and −30 C°) impact strength, as measured according to ISO 180/1U, of within a range having a lower limit and/or an upper limit. The range can include or exclude the lower limit and/or the upper limit. The lower limit and/or upper limit can be selected from 30, 35, 40, 45, 50, 55, 60, 65, 70, 75, 80, 85, 90, 95 and 100 kj/m². For example, according to certain preferred embodiments, the component can have an Izod unnotched (80*10*4 at +23° C. and −30 C°) impact strength, as measured according to ISO 180/1U, of at least 40 kJ/m².

The component can have a Vicat softening temp, rate 13/120, as measured according to ISO 306, within a range having a lower limit and/or an upper limit. The range can include or exclude the lower limit and/or the upper limit. The lower limit and/or upper limit can be selected from 180, 185, 190, 195, 200, 205, 210, 215, 220, 225, 230, 235, 240, 245, 250, 255, 260, 265, 270, 275, 280, 285, 290, 295 and 300° C. For example, according to certain preferred embodiments, the component can have a Vicat softening temp, rate B/120, as measured according to ISO 306, of 220° C.

The component can have an HDT/Ae, 1.8 MPa Edgew 120*10*4 sp=100 mm, as measured according to ISO 75/Ae, within a range having a lower limit and/or an upper limit. The range can include or exclude the lower limit and/or the upper limit. The lower limit and/or upper limit can be selected from 170, 175, 180, 185, 190, 195, 200, 205, 210, 215, 220, 225, 230, 235, 240, 245, 250, 255, 260, 265, 270, 275, 280, 285, 290, 295 and 300° C. For example, according to certain preferred embodiments, the component can have an HDT/Ae, 1.8 MPa Edgew 120*10*4 sp=100 mm, as measured according to ISO 75/Ae, of 210° C.

The polymeric component can comprise a polyetherimide (PEI). The pump can comprise a plurality of additional components, and each of the plurality of additional components can also comprise polyetherimide. The component can comprise one selected from the group consisting of a polyetherimide copolymer, a polyetherimide terpolymer, a filled polyetherimide, an unfilled polyetherimide, a polyetherimide blend, and combinations thereof. The component can comprise a filled polyetherimide, wherein the polyetherimide is filled with one selected from the group consisting of carbon particles, a polyetherimide filled with metal, ceramic, glass, and combinations thereof. The component can further comprise one selected from the group consisting of a polyphenylsulfone (PPSU), a polyether ether ketone (PEEK), a polyphthalamide (PPA), a polyphenylene sulfide (PPS), and combinations thereof.

Preferred polyimides include polyetherimides and polyetherimides copolymers. The polyetherimide can be selected from (i) polyetherimide homopolymers, e.g., polyetherimides, (ii) polyetherimide co-polymers, e.g., polyetherimide sulfones, and (iii) combinations thereof. Polyetherimides are known polymers and are sold by SABIC Innovative Plastics under the ULTEM®*, EXTEM®*, and Siltem* brands (Trademark of SABIC Innovative Plastics IP B.V.).

In one embodiment, the polyetherimides are of formula (1):

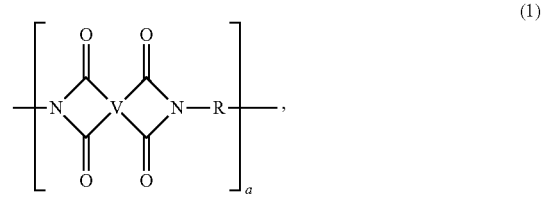

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

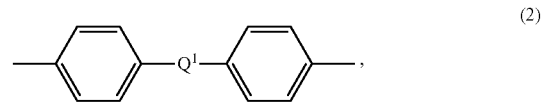

wherein $Q^1$ includes but is not limited to a divalent moiety such as —O—, —S—, —C(O)—, —SO₂—, —SO—, —$C_yH_{2y}$— (y being an integer from 1 to 5), and halogenated derivatives thereof, including perfluoroalkylene groups.

In an embodiment, linkers V include but are not limited to tetravalent aromatic groups of formula (3):

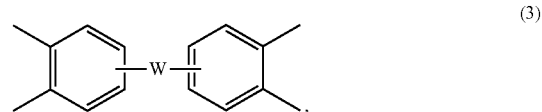

wherein W is a divalent moiety including —O—, —SO₂—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

(4)

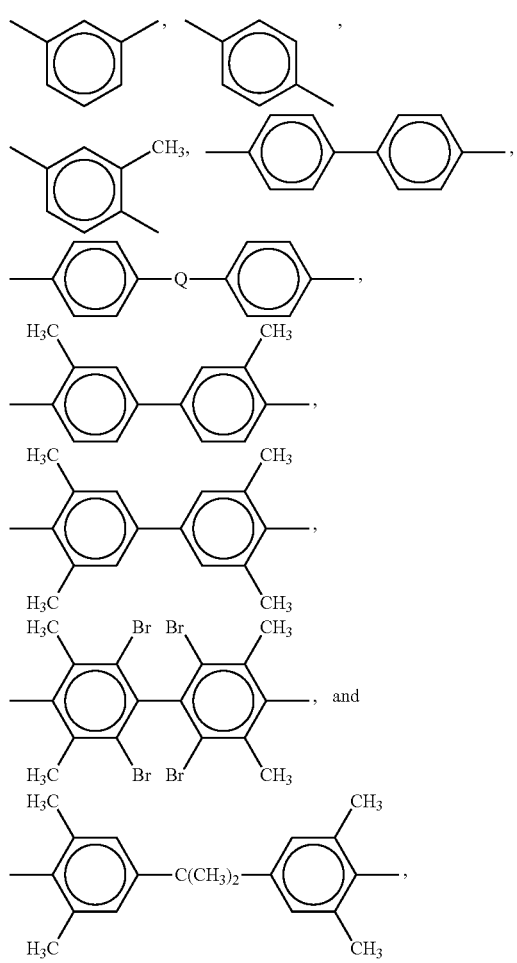

wherein Q includes, but is not limited to a divalent moiety including —O—, —S—, —C(O), —SO₂—, —SO—, —C_yH_{2y}— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

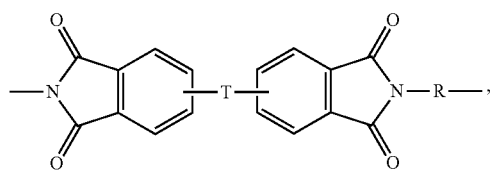
(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyetherimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6):

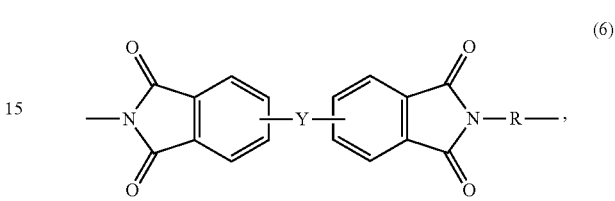
(6)

wherein Y is —O—, —SO₂—, or a group of the formula —O—Z—O— wherein the divalent bonds of the —O—, SO₂—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO₂— groups.

It is to be understood that the polyetherimides and polyetherimide sulfones can optionally comprise linkers V that do not contain ether or ether and sulfone groups, for example linkers of formula (7):

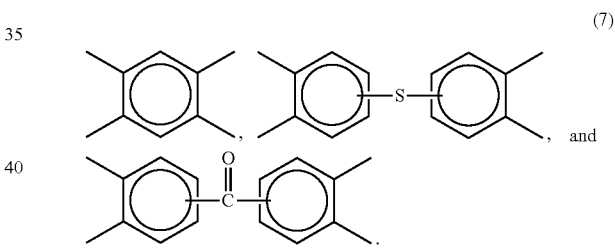
(7)

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of a bis(phthalimide) for formula (8):

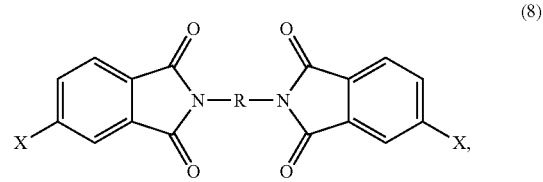
(8)

wherein R is as described above and X is a nitro group or a halogen. Bis-phthalimides (8) can be formed, for example, by the condensation of the corresponding anhydride of formula (9):

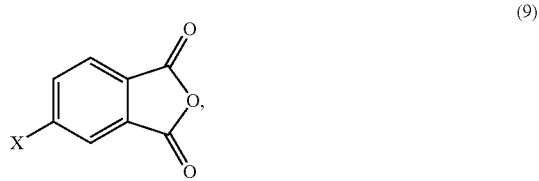

(9)

wherein X is a nitro group or halogen, with an organic diamine of the formula (10):

H$_2$N—R—NH$_2$    (10), wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenedianmine, 2,5-dimethylhexamethylenediamine, 2,5-dimethylhcptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether and 1,3-bis(3-aminopropyl) tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl)sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination with each other and/or other of the disclosed polymeric materials in fabricating the polymeric components of the invention. In one embodiment, only the polyetherimide is used. In another embodiment, the weight ratio of polyetherimide: polyetherimide sulfone can be from 99:1 to 50:50.

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418. In some embodiments, the polyetherimide and, in particular, a polyetherimide has a glass transition temperature of 240 to 350° C.

The polyetherimides can have a melt index of 0.1 to 10 grams per minute (g/min), as measured by American Society for Testing Materials (ASTM) DI 238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischloro phthalimide of meta-phenylene diamine (CAS No. 148935-94-8). The bischloro phthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischloro phthalimides which may be polymerized by chloro-displacement with BPA disodium salt as described above.

Siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (I):

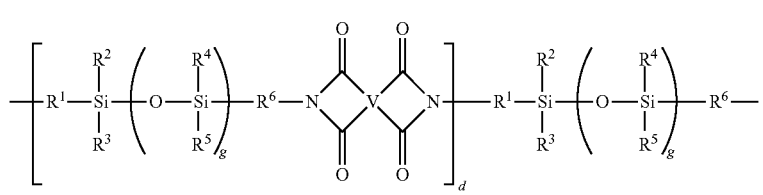

(I)

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyetherimide resin can have a weight average molecular weight (Mw) from 5,000 to 100,000 daltons, from 5,000 to 80,000 daltons, or from 5,000 to 70,000 daltons. The primary alkyl amine modified polyetherimide will have lower molecular weight and higher melt flow than the starting, unmodified, polyetherimide.

The polyetherimide resin can be selected from the group consisting of a polyetherimide, for example as described in U.S. Pat. Nos. 3,875,116; 6,919,422 and 6,355,723 a silicone polyetherimide, for example as described in U.S. Pat. Nos. 4,690,997; 4,808,686 a polyetherimide sulfone resin, as described in U.S. Pat. No. 7,041,773 and combinations thereof, each of these patents are incorporated herein their entirety.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300 and 310 degrees Celsius. For example, the polyetherimide resin can have a glass transition temperature (Tg) greater than about 200 degrees Celsius.

The polyetherimide resin can be substantially free (less than 100 ppm) of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free (less than 100 ppm) of halogen atoms. The polyetherimide resin can be free of halogen atoms. The polyetherimide resin can have an amount of halogen atoms below 100 ppm. In one embodiment, the amount of halogen atoms range from more than 0 to below 100 ppm. In another embodiment, the amount of halogen atoms is not detectable.

In one embodiment, the polyetherimides include a polyetherimide thermoplastic resin composition, comprising: (a) a polyetherimide resin, and (b) a phosphorus-containing stabilizer, in an amount that is effective to increase the melt stability of the poly-etherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of a 20° C. per minute under an inert atmosphere. In one embodiment, the phosphorous-containing stabilizer has a formula P—R'$_a$, where R' is independently H, alkyl, alkoxy, aryl, aryloxy, or oxy substituent and a is 3 or 4. Examples of such suitable stabilized polyetherimides can be found in U.S. Pat. No. 6,001,957, incorporated herein in its entirety.

The pump can have a lower noise vibration harshness compared to a second pump that is identical to the pump except that the corresponding component does not comprise polyetherimide, but rather a metal. The lower noise vibration harshness can comprise a reduction in decibel level of within a range having a lower limit and/or an upper limit. The range can include or exclude the lower limit and/or the upper limit. The lower limit and/or upper limit can be selected from 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95 and 100%. For example, according to certain preferred embodiments, the lower noise vibration harshness can comprise a reduction in decibel level of at least 10% and can range from at least 10% to 50% or more.

The component can be a housing defining an inlet and an outlet of the positive displacement pump. The housing can be made of polyetherimide. The component can be a rotor operatively positioned between an inlet and an outlet. The inlet and the outlet can be defined by a housing, and the rotor can comprise a displacement component for displacing a liquid between the inlet and the outlet, wherein the displacing component is one selected from the group consisting of a vane, a gear, and a trachoid. A preferred displacement component is a roller vane. The rotor can comprise a polyetherimide. The displacement component can comprise polyetherimide.

The pump according to the first embodiment can be optimized to minimize inner stress levels in the housing.

The inner stress levels in the housing can range from within a range having a lower limit and/or an upper limit. The range can include or exclude the lower limit and/or the upper limit. The lower limit and/or upper limit can be selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70 and 75 MPa. For example, according to certain preferred embodiments, the inner stress levels in the housing can range from 0 to 35 MPa or the inner stress levels in the housing can be about 10 MPa.

The inner stress levels in the housing can be determined by a method selected from the group consisting of measuring the inner stress levels via wire-resistance-strain gauges, or predicting the inner stress levels via CAE computer simulation software, and combinations thereof.

A second embodiment relates to a method of making a positive displacement pump for pumping liquids. The pump can comprise a housing defining an inlet and an outlet, a rotor operatively positioned between the inlet and the outlet, the rotor having means for displacing a liquid between the inlet and the outlet. The method can comprise forming at least one component of the pump from polyetherimide. The at least one component can be machined from a solid block of polyetherimide. The at least one component can be injection molded from polyetherimide, or formed by casting, forging or transfer/compression molding a polyetherimide based polymer.

The invention is further described in the following illustrative examples in which all parts and percentages are by weight unless otherwise indicated.

EXAMPLES

Examples 1-6

Purpose:

The purpose of these examples is to compare roller vane pumps having components made from various polyetherimides with a roller van pump having components made from another engineering plastic that is commonly used in automobile engines. The Examples demonstrate that polyetherimides provide better chemical resistance; better stress and strain values; better stability; the same ability to be filled with glass fiber filling (i.e. polyetherimides can be filled with glass fiber in amounts including, but not limited to 0.5 wt. %, 30 wt. %, or 45 wt. % and ranges therein, i.e., between 0.5% to 45%). Polyetherimide can also allow for simple production of pump parts through injection molding without after-machining.

Materials

Polyetherimides employed are commercially available under the ULTEM® brand, but preferred polyetherimides are ULTEM® 2300 resin and ULTEM® 3452 resin. The polyamide employed was PA66 GF30, which is available from various suppliers. Comparison was made to PA66 GF30, because it is an engineering plastic used in association with automobile engine components.

ULTEM® 2300 resin and ULTEM® 3452 resin have the following estimated general properties: Tensile Stress$_{160°\,C.}$ of about 90 N/mm$^2$; Tensile Stress$_{160°\,C.}$ of about 35 N/mm$^2$ (long term durability, first values); Poisson's ratio of about $\nu$ 0.38; and Density of about $\rho$=1.66 g/cm$^3$.

Specific properties of ULTEM® 2300 are summarized in Table 1. ULTEM® 2300 can be 30% glass fiber filled by weight, can have flow properties similar to other polyetherimides, can have a glass transition temperature (Tg) of about 217° C. ULTEM® 2300 resin can be Restriction of Hazard Substances (RoHS) compliant according to European Union regulations. ULTEM® 2300 resin can have a UL94 V0 and 5VA listing.

TABLE 1

|  | Value | Unit | Standard |
| --- | --- | --- | --- |
| MECHANICAL |  |  |  |
| Taber Abrasion, CS-17, 1 kg | 20 | mg/1000 cy | SABIC Method |
| Tensile Stress, break, 5 mm/min | 165 | MPa | ISO 527 |
| Tensile Strain, break, 5 mm/min | 2 | % | ISO 527 |
| Tensile Modulus, 1 mm/min | 9500 | MPa | ISO 527 |
| Flexural Stress, break, 2 mm/min | 225 | MPa | ISO 178 |
| Flexural Modulus, 2 mm/min | 8500 | MPa | ISO 178 |
| Hardness, H358/30 | 165 | MPa | ISO 2039-1 |
| IMPACT |  |  |  |
| Izod Impact, unnotched 80 * 10 * 4 +23° C. | 40 | kJ/m$^2$ | ISO 180/1U |
| Izod Impact, unnotched 80 * 10 * 4 −30° C. | 40 | kJ/m$^2$ | ISO 180/1U |
| Charpy Impact, notched, 23° C. | 10 | kJ/m$^2$ | ISO 179/2C |
| Charpy 23° C., Unnotch Edgew 80 * 10 * 4 sp = 62 mm | 40 | kJ/m$^2$ | ISO 179/1eU |
| Charpy −30° C., Unnotch Edgew 80 * 10 * 4 sp = 62 mm | 40 | kJ/m$^2$ | ISO 179/1eU |

TABLE 1-continued

|  | Value | Unit | Standard |
|---|---|---|---|
| THERMAL | | | |
| Thermal Conductivity | 0.29 | W/m-° C. | ISO 8302 |
| CTE, 23° C. to 150° C., flow | 2.E−05 | 1/° C. | ISO 11359-2 |
| CTE, 23° C. to 150° C., xflow | 6.E−05 | 1/° C. | ISO 11359-2 |
| Ball Pressure Test, 125° C. +/− 2° C. | PASSES | — | IEC 60695-10-2 |
| Vicat Softening Temp, Rate A/50 | 225 | ° C. | ISO 306 |
| Vicat Softening Temp, Rate B/50 | 213 | ° C. | ISO 306 |
| Vicat Softening Temp, Rate B/120 | 220 | ° C. | ISO 306 |
| HDT/Be, 0.45 MPa Edgew 120 * 10 * 4 sp = 100 mm | 215 | ° C. | ISO 75/Be |
| HDT/Ae, 1.8 MPa Edgew 120 * 10 * 4 sp = 100 mm | 210 | ° C. | ISO 75/Ae |
| Relative Temp Index, Elec | 180 | ° C. | UL 746B |
| Relative Temp Index, Mech w/impact | 170 | ° C. | UL 746B |
| Relative Temp Index, Mech w/o impact | 180 | ° C. | UL 746B |
| PHYSICAL | | | |
| Mold Shrinkage on Tensile Bar, flow (2) (5) | 0.2-0.4 | % | SABIC Method |
| Density | 1.51 | g/cm³ | ISO 1183 |
| Water Absorption, (23° C./sat) | 0.9 | % | ISO 62 |
| Moisture Absorption (23° C./50% RH) | 0.5 | % | ISO 62 |
| Melt Volume Rate, MVR at 360° C./5.0 kg | 6 | cm³/10 min | ISO 1133 |
| ELECTRICAL | | | |
| Volume Resistivity | 1.E+15 | Ohm-cm | IEC 60093 |
| Surface Resistivity, ROA | >1.E+15 | Ohm | IEC 60093 |
| Dielectric Strength, in oil, 0.8 mm | 35 | kV/mm | IEC 60243-1 |
| Dielectric Strength, in oil, 1.6 mm | 26 | kV/mm | IFC 60243-1 |
| Dielectric Strength, in oil, 3.2 mm | 15 | kV/mm | IEC 60243-1 |
| Relative Permittivity, 1 MHz | 3.4 | — | IEC 60250 |
| Dissipation Factor, 50/60 Hz | 0.001 | — | IEC 60250 |
| Dissipation Factor, 1 MHz | 0.002 | — | IEC 60250 |
| Dissipation Factor, 2450 MHz | 0.005 | — | IEC 60250 |
| Comparative Tracking Index | 150 | V | IEC 60112 |
| Comparative Tracking Index, M | 100 | V | IEC 60112 |
| Relative Permittivity, 50/60 Hz | 3.3 | — | IEC 60250 |
| FLAME CHARACTERISTICS | | | |
| UL Recognized, 94V-0 Flame Class Rating (3) | 0.25 | mm | UL 94 |
| UL Recognized, 94-5VA Rating (3) | 1.2 | mm | UL 94 |
| Glow Wire Flammability Index 960° C., passes at | 3.2 | mm | IEC 60695-2-12 |
| Oxygen Index (LOI) | 48 | % | ISO 4589 |

More specific properties of ULTEM® 3452 are summarized in Table 2. ULTEM® 3452 can be 45 wt. % Glass fiber and mineral filled, can provide enhanced flow relative to other polyetherimides, can have a glass transition temperature (Tg) of about 217° C., and can have enhanced dimensional stability. ULTEM® 3452 resin can be Restriction of Hazard Substances (RoHS) compliant according to European Union regulations. ULTEM® 3452 can have a UL94 V0 and 5VA listing in recognized colors.

TABLE 2

|  | Value | Unit | Standard |
|---|---|---|---|
| MECHANICAL | | | |
| Tensile Stress, break, 50 mm/min | 100 | MPa | ISO 527 |
| Tensile Strain, break, 50 mm/min | 1.5 | % | ISO 527 |
| Tensile Modulus, 1 mm/min | 12500 | MPa | ISO 527 |
| Flexural Stress, break, 2 mm/min | 150 | MPa | ISO 178 |
| Flexural Modulus, 2 mm/min | 12000 | MPa | ISO 178 |
| IMPACT | | | |
| Izod Impact, unnotched 80 * 10 * 4 +23° C. | 14 | kJ/m² | ISO 180/1U |
| Izod Impact, unnotched 80 * 10 * 4 −30° C. | 13 | kJ/m² | ISO 180/1U |
| Izod Impact, notched 80 * 10 * 4 +23° C. | 5 | kJ/m² | ISO 180/1A |
| Izod Impact, notched 80 * 10 * 4 −30° C. | 4 | kJ/m² | ISO 180/1A |
| Charpy 23° C., V-notch Edgew 80 * 10 * 4 sp = 62 mm | 4 | kJ/m² | ISO 179/1eA |
| Charpy −30° C., V-notch Edgew 80 * 10 * 4 sp = 62 mm | 4 | kJ/m² | ISO 179/1eA |
| Charpy 23° C., Unnotch Edgew 80 * 10 * 4 sp = 62 mm | 14 | kJ/m² | ISO 179/1eU |
| Charpy −30° C., Unnotch Edgew 80 * 10 * 4 sp = 62 mm | 14 | kJ/m² | ISO 179/1eU |
| THERMAL | | | |
| CTE, 23° C. to 80° C., flow | 1.9E−05 | 1/° C. | ISO 11359-2 |
| CTE, 23° C. to 80° C., xflow | 3.6E−05 | 1/° C. | ISO 11359-2 |
| Vicat Softening Temp, Rate B/50 | 205 | ° C. | ISO 306 |

TABLE 2-continued

|  | Value | Unit | Standard |
| --- | --- | --- | --- |
| Vicat Softening Temp, Rate B/120 | 205 | ° C. | ISO 306 |
| HDT/Be, 0.45 MPa Edgew 120 * 10 * 4 sp = 100 mm | 207 | ° C. | ISO 75/Be |
| HDT/Ae, 1.8 MPa Edgew 120 * 10 * 4 sp = 100 mm | 200 | ° C. | ISO 75/Ae |
| PHYSICAL | | | |
| Mold Shrinkage on Tensile Bar, flow (2) (5) | 0.25 | % | SABIC Method |
| Density | 1.66 | g/cm$^3$ | ISO 1183 |
| Melt Volume Rate, MVR at 360° C./5.0 kg | 8 | cm$^3$/10 min | ISO 1133 |
| ELECTRICAL | | | |
| Volume Resistivity | >1.E+13 | Ohm-cm | IEC 60093 |
| Surface Resistivity, ROA | >1.E+15 | Ohm | IEC 60093 |
| Dielectric Strength, in oil, 3.2 mm | 16 | kV/mm | IEC 60243-1 |
| Relative Permittivity, 1 MHz | 3.6 | — | IEC 60250 |
| Dissipation Factor, 50/60 Hz | 0.01 | — | IEC 60250 |
| Dissipation Factor, 1 MHz | 0.015 | — | IEC 60250 |
| Comparative Tracking Index | 125 | V | IEC 60112 |
| Relative Permittivity, 50/60 Hz | 3.7 | — | IEC 60250 |
| FLAME CHARACTERISTICS | | | |
| UL Recognized, 94V-0 Flame Class Rating (3) | 0.77 | mm | UL 94 |
| UL Recognized, 94-5VA Rating (3) | 3 | mm | UL 94 |

Table 3 provides properties of PA66 GF30 black.

TABLE 3

| | Properties | | |
| --- | --- | --- | --- |
| | PA66 GF30 black | | |
| Material Data Sheet | dry/moist | | standard |
| Mechanical | | | |
| Tensile strength at break | 110 | MPa | DIN EN ISO 527 |
| Elongation at break | 6 | % | DIN EN ISO 527 |
| Modulus of elasticity in tension | 7000 | MPa | DIN EN ISO 527 |
| Hardness | 200 | | ISO 2039/1 (Kugeldruck-Harte) |
| Impact strength 23° C. (Charpy) | 70 | KJ/m$^2$ | DIN EN ISO 179 (Charpy) |
| Time yield limit | 40 | MPa | |
| for 1% elongation after 1000 h | | | |
| Co-efficient of friction | 0.45-0.50/0.5 | | |
| p = 0.05 N/mm$^2$v = 0.6 m/s | | | |
| on steel, hardened and ground | | | |
| Thermal | | | |
| Glass transition temperature | 72/5 | ° C. | DIN 53 765 |
| Heat distortion temperature | 250 | ° C. | ISO-R 75 Verfahren A (DIN 53 461) |
| HDT, Method A | | | |
| Heat distortion temperature | 250 | ° C. | ISO-R 75 Verfahren B (DIN 53 461) |
| HDT, Method B | | | |
| Max. service temperature | | | |
| short term | 170 | ° C. | |
| long term | 110 | ° C. | |
| Thermal conductivity (23° C.) | 0.27 | W/(K · m) | |
| Specific heat (23° C.) | 1.5 | J/g · K | |
| Coefficient of thermal expansion | 2-3 | 10$^{-5}$1/K | DIN 53 752 |
| (23-55° C.) | | | |
| Electrical | | | |
| Miscellaneous | | | |
| Density | 1.35 | g/cm$^3$ | DIN 53 479 |
| Moisture absorption | 1.5 | % | DIN EN ISO 62 |
| (23° C./50RH) | | | |
| Water absorption to equilibrium | 5.5 | % | DIN EN ISO 62 |
| Flammability acc. to UL standard 94 | HB | | |
| Resistance to hot water, washing soda: | (+) | | (1) Testing of semi-finished products |

Example 1A

Techniques and Procedures

Referring to FIG. 1A, a variable roller cell oil pump 1 was made of Ultem®2300 resin for application in passenger car engines. The pump 1 included a guiding ring 2, a plurality of rolls 3, a rotor 4, a first race 7, a regulation spring 5, an adjusting ring 8, a second race 9, a regulation piston 6, a spring pressure control 10, a ball 11, and a housing 12.

Figure 1B:
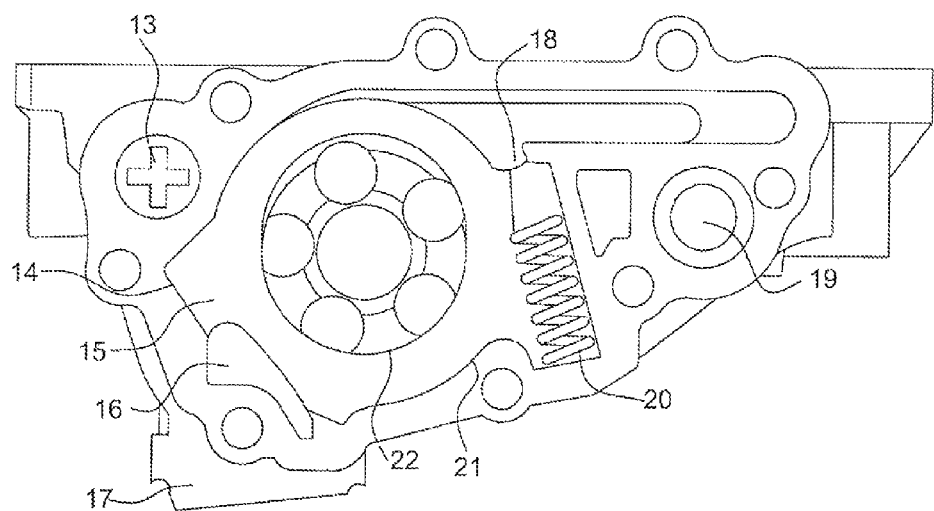
FIG. 1B shows a schematic cross-sectional view of the roller cell oil pump of FIG. 1A, along line A-A.

FIG. 1B provides a cross-sectional view of the roller cell oil pump of FIG. 1A, along line A-A, showing regulation/control piston 13, regulation axis 14, adjusting ring 15, suction volume 16, suction tube 17, pressure room 18, cold start valve 19, regulation/control spring 20, regulation/control volume 21, and rotor 22.

Table 4 provides details of each component of the pump according to Example 1A. Table 4 shows that ULTEM® 2300 and other polymers of similar density can be employed.

TABLE 4

| component | material | density [g/cm$^3$] |
|---|---|---|
| housing | ULTEM 2300 | 1.51 |
| cap | ULTEM 2300 | 1.51 |
| race 1 | steel | 7.85 |
| adjusting ring | ULTEM 2300 | 1.51 |
| race 2 | steel | 7.85 |
| rotor | steel | 7.85 |
| roll | steel | 7.85 |
| guiding ring | PEEK-HPV | 1.51 |
| ball | steel | 7.85 |
| spring pr.c. | steel | 7.85 |
| reg. piston | PA66 GF30 | 1.51 |
| reg. spring | steel | 7.85 |

The roller cell oil pump was selected for the design of a polymeric component oil pump, because roller cell oil pumps have many benefits. For example, these controllable pumps only take in the amount of oil the engine needs, and can reduce power consumption and $CO_2$ emissions. The pump is suitable for speeds above 6000 rpm and can be used for all car gasoline and diesel motors. Additionally, inner friction of rotational parts is limited compared to other pump design such as gear pumps and potentially enable all polymeric oil pump parts to be made from PEI resin based materials.

It will be appreciated by a person having ordinary skill in the art that different control strategies are possible. For example a 2 stage pressure control or a map-based control can be employed. Additionally, different types of pumps may be employed.

The oil pump prototype was based on an existing oil pump in terms of package and design space restraints used in a high volume 4 cylinder gasoline engine. The housing, cap, and adjusting ring of the oil pump prototype were milled from an extruded ULTEM® 2300 block, which is a cost effective approach compared to tool building and injection molding which will eventually be the production technology of choice. Other types of forming can include casting, forging, or compression molding. Extruded ULTEM® 2300 blocks however, can show inhomogeneous areas of unmolten resin particles which can lead to a structural weakness, which would not be expected in the case of an injection molded part. These unmolten areas can be seen in FIG. 3 as a "marble-like" effect. An injection molded part would show one homogenous amber color. The functional prototype shown in FIG. 3 was based on the optimized schematic illustrated in FIGS. 2A-J.

The testing results need to be interpreted considering above mentioned process of prototyping. After running for approximately 40 hours on a test bench, the oil pump did not exhibit a "leak of performance." Performance of five initial characteristics curve tests (temperature and rpm) for oil pump prototype with housing, cover, adjusting ring in plastics and remaining parts in metal was conducted. The pump also fulfilled low friction requirements, exhibiting n=50±5 min-1, Mdmax=0.2 Nm.

Example 1B

In this Example pump, efficiency is optimized by increasing flow channel throughput under the given package space constraints; and a redesign of the oil pump housing to ensure long term material stability by modifying and reinforcing the chain pull area.

The pump efficiency can be effected by flow channel shape (whether square or circular), flow channel volume, flow channel surface characteristics (smoothness or roughness), and avoid abrupt transitions between different flow channels.

Figure 2G:
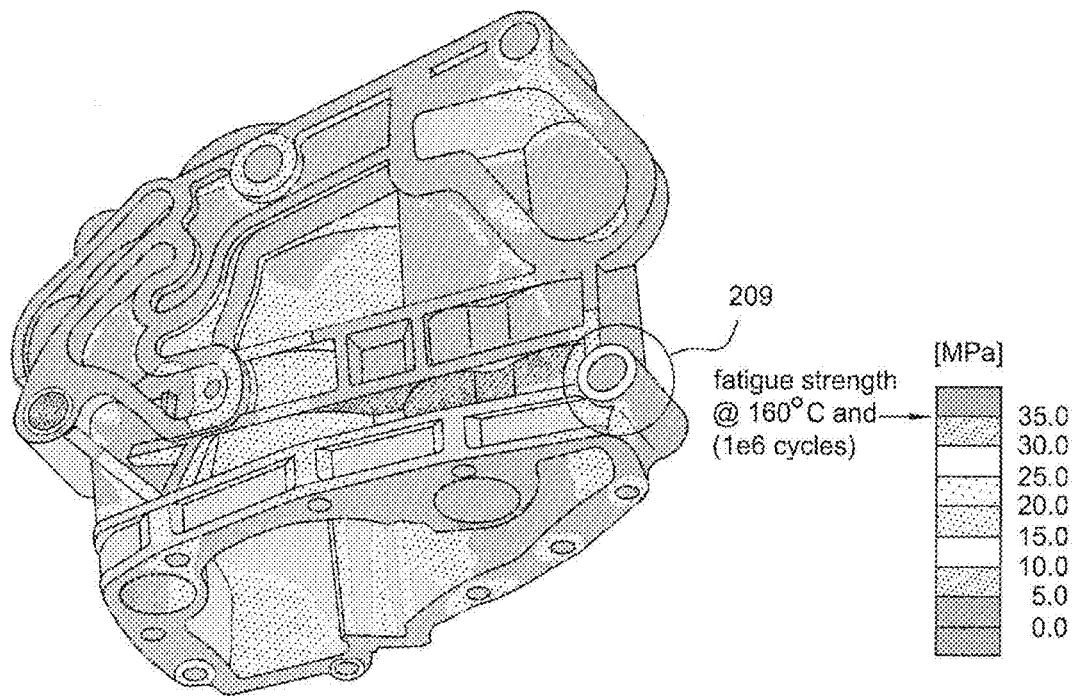
Figure 2H:
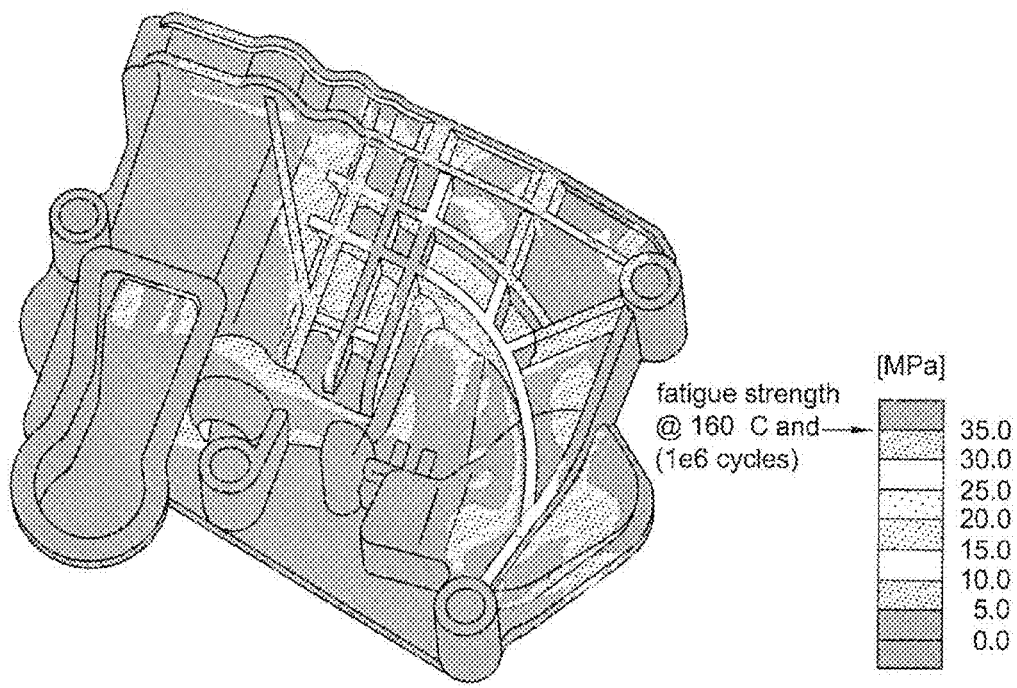

Computer-rendered schematics are shown in FIGS. 2A-J, illustrating the use of simplified Pro/E Mechanical Strength Calculations in redesigning the plastic roller cell pump. FIGS. 2A-D show new ribbings implemented as a result of topology optimization results. New ribbing 204 can be implemented to address stress 201; new ribbing 250 can be implemented to address stress 202; new ribbing 206 can be implemented to address stress 203; and new ribbing 208 can be implemented to address stress 207. FIG. 2E-J show stresses in the pump housing as measured at 7 bar working pressure at 106° C. In FIG. 2G, a stress peak 209 is noted.

The plastics oil pump deformation and strength was calculated for maximum pressure of 7 bar and chain force loading of 1.2 kN (max. stress level 90 MPa).

A nonlinear finite element calculation was done with isotropic linear material behavior for the ULTEM® 2300 resin assuming randomly distributed glass fibers. The calculation confirmed the technical feasibility of the oil pump concept and packaging.

Figure 3:
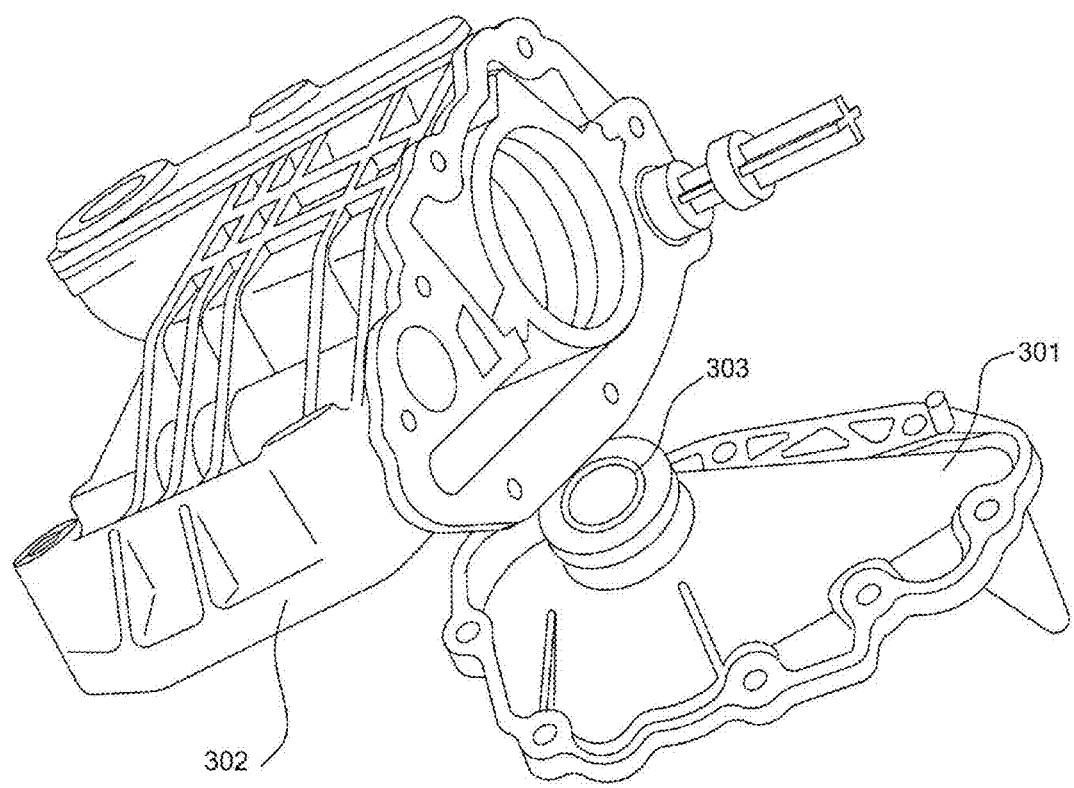
FIG. 3 shows a functional prototype according to one embodiment.

Contemplated production of units is by injection molding each of the cover 301 and housing 302 as individual units with optional metallic bearing surfaces 303, positioned as illustrated in FIG. 3. Other forms of molding include transfer molding, forging, and stockshape extrusion. The use of lost wax process and frangible patterns can be employed as desired to facilitate shaping of the interior portions of the housing.

According to various embodiments, additional optimization can be achieved by decreasing the stress level to 35 MPa; stiffening the bottom of the regulation chamber; reducing the deformations and strains; providing a stiffer and clamped suction chamber cover; increasing the radius at the back-side/bottom-side edge of the regulation chamber.

Comparative Example 1

A traditional metal gear oil pump was evaluated for comparative purposes. All parts are made from metal. Housing and cover normally made from Aluminium alloys, inner parts normally made from steel.

Results

The optimized prototype of Example 1B showed improved efficiency compared to the pump of Example 1A. See FIG. 4.

Figure 4:
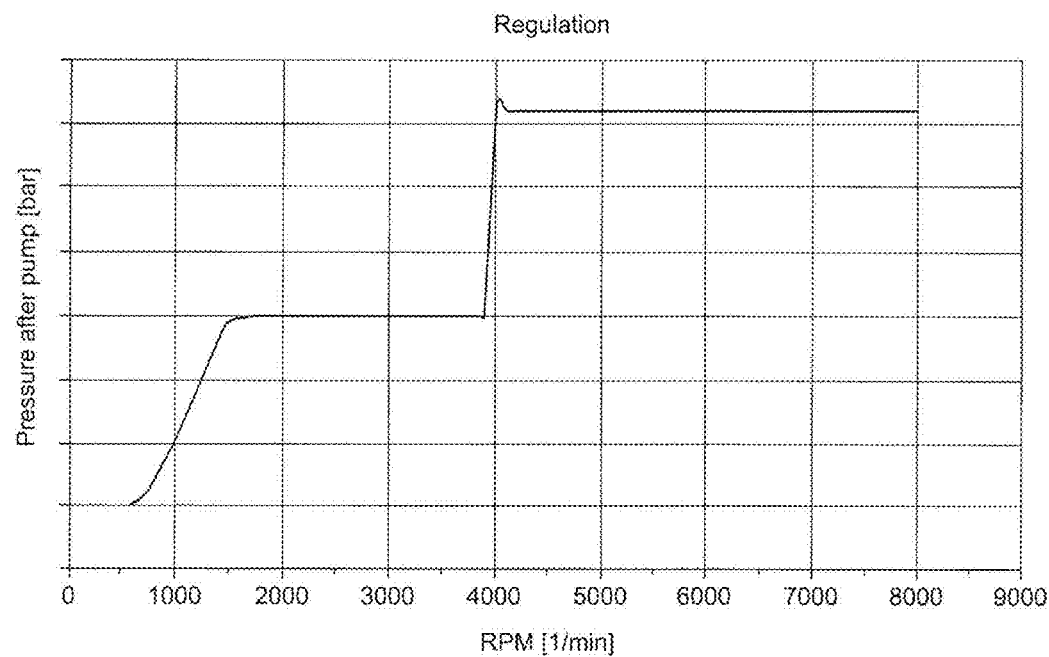
FIG. 4 shows performance curves of two stage systems and demonstrates the good functionality of the oil pump regulation.

FIG. 4 shows performance curves of two stage systems and demonstrates the good functionality of the oil pump regulation. FIG. 4 compares Example 1A to Example 1B.

Figure 5:
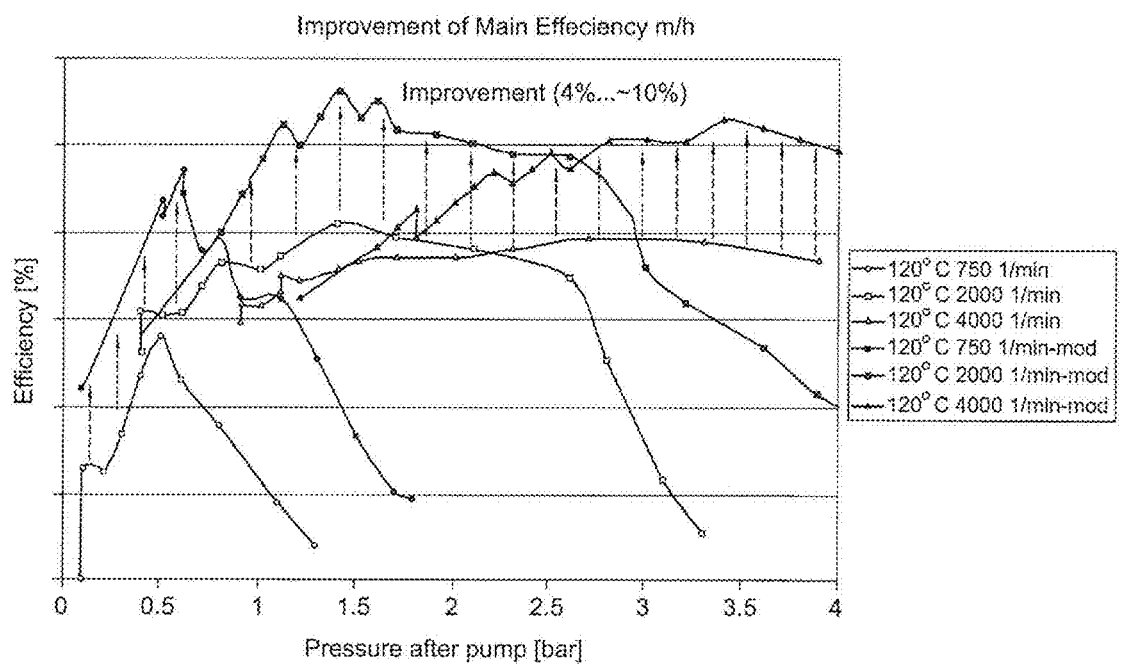
FIG. 5 shows a chart, plotting efficiency versus oil pressure for the pump according to Example 1A and the optimized pump according to comparative Example 1B.

FIG. 5 is a chart, plotting efficiency versus oil pressure for the pump according to Example 1A and the optimized pump according to comparative Example 1B. The results for the pump according to Example 1A are shown in solid shapes. The results for the pump according to Example 1B are shown in blue. As can be seen from the figure, the efficiency of the pump according to Example 1B was improved by about 4 to 10%, depending on the oil pressure at the point of comparison.

Figure 6:
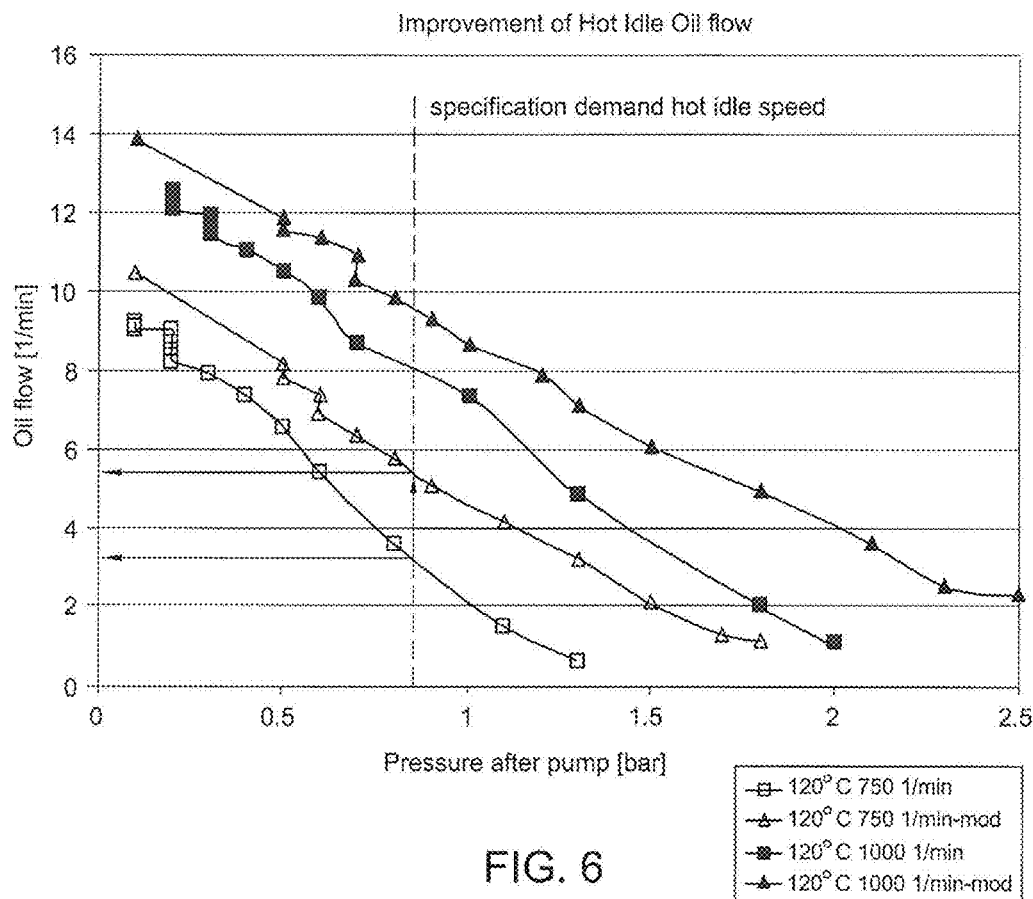
FIG. 6 shows a chart, plotting oil flow rate versus oil pressure for the pump according to Example 1A and the optimized pump according to comparative Example 1B.

FIG. 6 is a chart, plotting oil flow rate versus oil pressure for the pump according to Example 1A and the optimized pump according to comparative Example 1B. The results for the pump according to Example 1A are shown in solid shapes. The results for the pump according to Example 1B are shown in blue. FIG. 6 demonstrates that requirements for hot idling point have are fulfilled by the pumps of both Examples 1A and 1B. The hot idling point requirements are an oil flow rate of at least 5.8 liters per minute at 0.8 bar and 102° C., while the engine idles at about 850 U/min. Additionally, FIG. 6 shows that the pump according to Example 1B shows an improvement.

Figure 7:
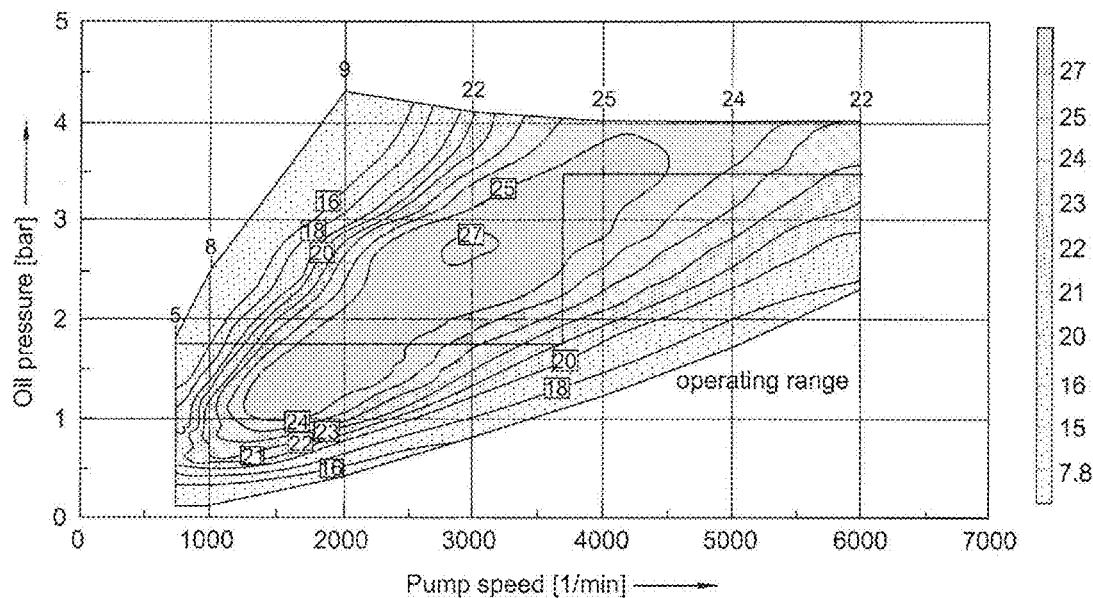
FIG. 7 shows a plot of efficiency over oil pressure and pump speed.

FIG. 7 is a plot of efficiency over oil pressure and pump speed.

Compared to the traditional metal pump, according to Comparative Example 2, the optimized prototype of Example 1B weighed 25% less. More specifically, the optimized prototype of Example 1 weighed about 1,250 grams, while the traditional metal pump weighed about 1,650 grams.

Figure 9A:
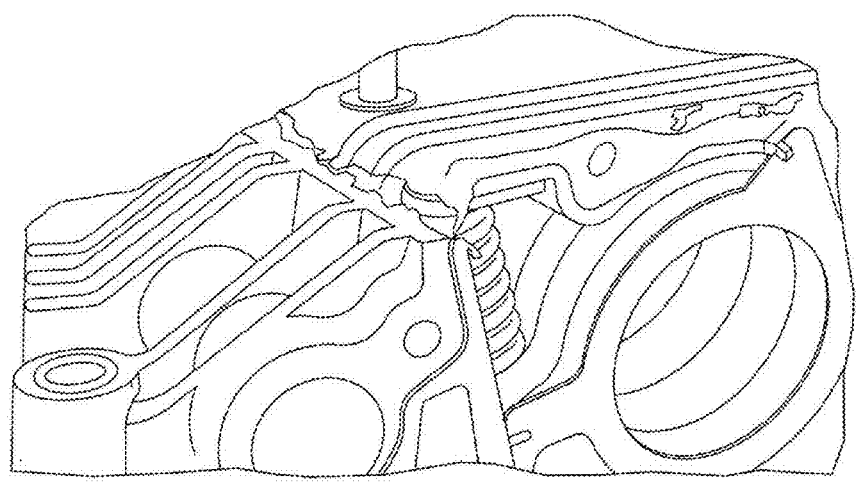
FIG. 9A shows crack in an oil pump housing developed after testing.
Figure 9B:
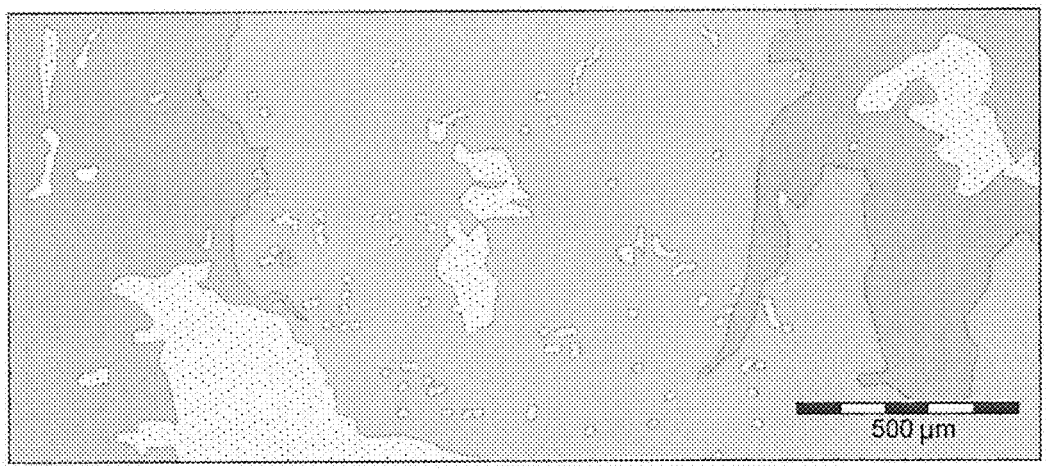
FIG. 9B, shows a magnified view of the fractured surface shown in FIG. 9A.

GApT/WTC showed that the fractured surface does not show any evidence of fibers coming out of the cracked surface, as shown in FIG. 9B, which is a magnified view of a fractured surface.

The lack of glass fibers pecking out from the fractured surface indicates that the way the stockshape is made by compressing pellets gave poorer results compared to Example 4. It was also discovered that once a crack initiates, the crack walks under the fatigue load through the resin rich-unreinforced surface areas where pellets fused together. Stockshape process leads to the pellets containing inhomogeneously melted leading to local accumulation of glass rich areas.

Example 6

The weights of roller cell pumps having various parts made from plastic was calculated and compared to similar roller cell pumps having various parts made from metal. In Scenario 1, the pump housing, cover, and adjustment rings can be made from plastic. The total weight of the roller cell pump, according to Scenario 1, would be about 1.246 kg. In Scenario 2, the housing and the cover can be made from plastic. The total weight of the roller cell pump, according to Scenario 2, would be about 1.496 kg. In Scenario 3, the housing and cover can be made from metal. The total weight of the roller cell pump, according to Scenario, 3 would be about 1.915 kg. Therefore, it can be readily seen that manufacturing parts from polymers rather than from metals can result in lower weight pumps. The table below summarizes these calculations and also provides exemplary prices of pumps produced according to the respective scenarios.

| Summary | | Scenario 1 housing & cover-adjusting ring in plastics | Scenario 2 housing & cover in plastics | Scenario 3 housing & cover in metal |
|---|---|---|---|---|
| Total Weight Roller Cell Pump | kg | 1.246 | 1.496 | 1.915 |
| Reference weight (existing external gear oil pump) | kg | 1.650 | 1.650 | 1.650 |
| Delta weight roller cell pump in metal + plastics vs reference pump | kg | −0.40 | −0.15 | 0.27 |
| Delta | kg | −24% | 0% | −16% |
| Production Cost Roller Cell Pump | € per oil pump | 17.91 | 18.79 | 18.08 |
| Target Price | € per oil pump | 15.00 | 16.00 | 16.00 |
| Reference Price (existing external gear oil pump) | € per oil pump | 19.00 | 19.00 | 19.00 |
| Delta Production Cost to Target Price | € per oil pump | 1.91 | 0.79 | 2.07 |
| Delta Production Cost to Reference Price | € per oil pump | −1.09 | −2.21 | −0.93 |

Compared to the traditional metal pump, the material costs of the optimized prototype of Example 1 resulted in a lower manufacturing cost. Furthermore, unlike the traditional metal pump, the optimized prototype can achieve further cost reductions through in house and localized production. See Table 1.

Compared to the traditional metal pump, the optimized prototype of Example 1, exhibited better Noise, Vibration, and Harshness (NVH) damping properties.

Comparative Example 5

Figure 8:
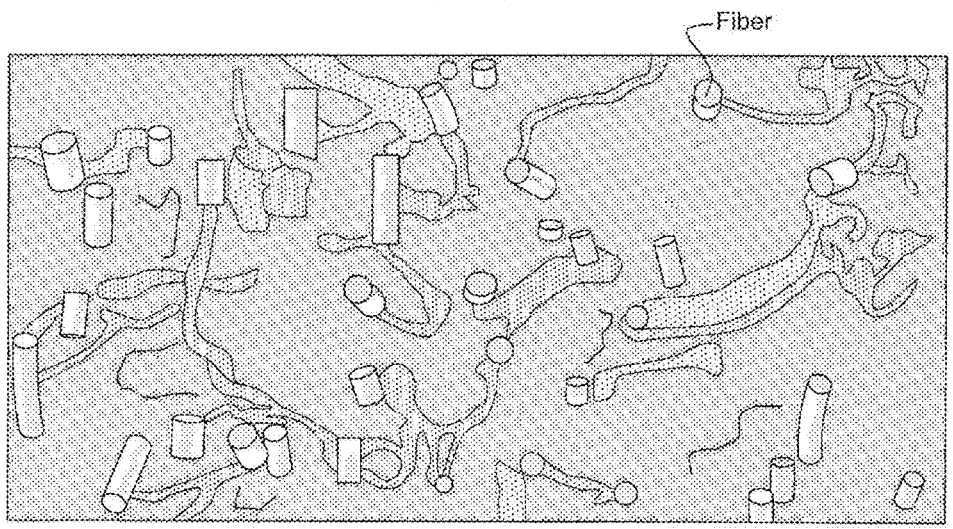
FIG. 8 shows a crack in a plastic homogeneously reinforced with glass fiber.

If the housing were deliberately cracked, it is expected that the surface of the cracked homogeneous glass fiber reinforced plastic would show glass fibers protruding as shown in FIG. 8.

The pump was tested. A crack in the oil pump housing developed after testing as shown in FIG. 9A. The fractured surface was analyzed. The material analysis performed by Purpose The purpose of the following examples is to compare the results that can be achieved by using pump parts comprising a polyetherimide in an automobile engine with the results that would be achieved by using other materials Inventive Example 7

Polyetherimide (PEI) can have a glass transition temperature (Tg) of about 217° C. Therefore, PEI does not exhibit a phase transition in the range of operating temperatures that occur within an internal combustion engine.

Figure 10:
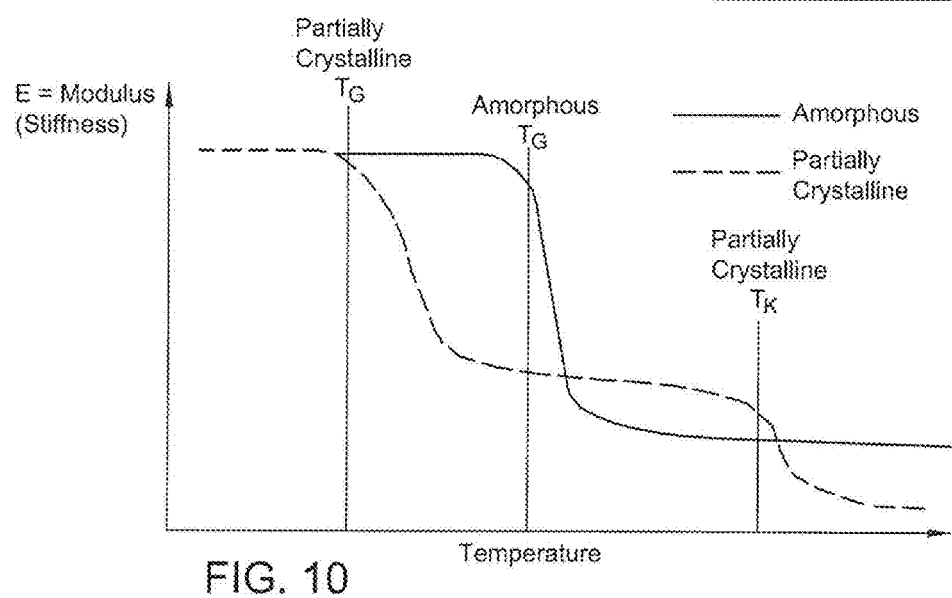
FIG. 10 shows a plot illustrating that Ultem is an amorphous, semi crystalline material.

It is beneficial that PEI's Tg is within a certain range of the operation temperature. FIG. 10, shows that Ultem is an amorphous material, semi-crystalline material. Compared to Polyetherimide, Polyamide will start softening with higher temperature and subsequently lose elastic modulus, rendering the material unsuitable.

Comparative Examples

Temperature Profile

Any resins with a glass transition temperature (Tg) below 150° C. would be likely to fail in such a harsh engine environment. This includes, for instance, most PP, PE, ABS, PA, PBT, PC and PPA resin grades. Therefore, a pump component made of one of these resins would not be suitable for use in an internal combustion engine.

Comparative Example

Structural Properties

Semi-crystalline resins loose their modulus as temperature increases. A pump component comprising PP, PE, PPS, PA, PBT, PPA resins would be expected to exhibit a loss in stiffness and strength, resulting in failure, rendering such a pump component unsuitable.

Comparative Example 9

Polyether ether ketone (PEEK) can have a glass transition temperature (Tg) of about 143° C. and a melt temperature (Tm) of about 340° C. Therefore, a pump component made of PEEK would not be suitable for use in an internal combustion engine.

PEEK has a lower modulus than PEI over the operating temperature range in an internal combustion engine. A pump component comprising PEI, a pump component made from PEEK would be expected to exhibit a loss in stiffness and strength, resulting in failure, rendering such a pump component unsuitable.

PEEK also has a higher coefficient of thermal expansion (CTE) than PEI over the operating temperature range in an internal combustion engine. A pump component made from PEEK would be expected to exhibit greater dimensional variation than a pump component comprising from PEI that would result in failure unless fillers are also employed. The need for fillers to reduce CTE variation would be expected to add weight to the pump component, thereby rendering the pump component less suitable.

Comparative Example 10

Polyamide (PA66) can have a glass transition temperature (Tg) of about 50° C. and a melt temperature (Tm) of about 260° C. Therefore, a pump component made of PA66 would not be suitable for use in an internal combustion engine.

PA66 has a lower modulus than PEI over the operating temperature range in an internal combustion engine. A pump component comprising PEI, a pump component made from PA66 would be expected to exhibit a loss in stiffness and strength, resulting in failure, rendering such a pump component unsuitable.

PA66 also has a higher coefficient of thermal expansion (CTE) than PEI over the operating temperature range in an internal combustion engine. A pump component made from PA66 would be expected to exhibit greater dimensional variation than a pump component comprising from PEI that would result in failure unless fillers are also employed. The need for fillers to reduce CTE variation would be expected to add weight to the pump component, thereby rendering the pump component less suitable.

Comparative Example 11

Polyamide (PA6) can have a glass transition temperature (Tg) of about 50° C. and a melt temperature (Tm) of about 223° C. Therefore, a pump component made of PA6 would not be suitable for use in an internal combustion engine.

PA6 has a lower modulus than PEI over the operating temperature range in an internal combustion engine. A pump component comprising PEI, a pump component made from PA6 would be expected to exhibit a loss in stiffness and strength, resulting in failure, rendering such a pump component unsuitable.

PA6 also has a higher coefficient of thermal expansion (CTE) than PEI over the operating temperature range in an internal combustion engine. A pump component made from PA6 would be expected to exhibit greater dimensional variation than a pump component comprising from PEI that would result in failure unless fillers are also employed. The need for fillers to reduce CTE variation would be expected to add weight to the pump component, thereby rendering the pump component less suitable.

Comparative Example 12

Semi-crystalline polyphthalamide (PPA) can have a glass transition temperature (Tg) of about 130° C. and a melt temperature (Tm) of about 310° C. Therefore, a pump component made of PPA would not be suitable for use in an internal combustion engine.

PPA has a lower modulus than PEI over the operating temperature range in an internal combustion engine. A pump component comprising PEI, a pump component made from PPA would be expected to exhibit a loss in stiffness and strength, resulting in failure, rendering such a pump component unsuitable.

PPA also has a higher coefficient of thermal expansion (CTE) than PEI over the operating temperature range in an internal combustion engine. A pump component made from PPA would be expected to exhibit greater dimensional variation than a pump component comprising from PEI that would result in failure unless fillers are also employed. The need for fillers to reduce CTE variation would be expected to add weight to the pump component, thereby rendering the pump component less suitable.

Comparative Example 13

Polybutylene terephthalate (PBT) can have a glass transition temperature (Tg) of about 50° C. and a melt temperature (Tm) of about 220° C. Therefore, a pump component made of PBT would not be suitable for use in an internal combustion engine.

PBT has a lower modulus than PEI over the operating temperature range in an internal combustion engine. A pump component comprising PEI, a pump component made from PBT would be expected to exhibit a loss in stiffness and strength, resulting in failure, rendering such a pump component unsuitable.

PBT also has a higher coefficient of thermal expansion (CTE) than PEI over the operating temperature range in an internal combustion engine. A pump component made from PBT would be expected to exhibit greater dimensional variation than a pump component comprising from PEI that would result in failure unless fillers are also employed. The need for fillers to reduce CTE variation would be expected to add weight to the pump component, thereby rendering the pump component less suitable.

Comparative Example 14

Polypropylene (PP) can have a glass transition temperature (Tg) of about −15° C. and a melt temperature (Tm) of about 176° C. Therefore, a pump component made of PP would not be suitable for use in an internal combustion engine.

PP has a lower modulus than PEI over the operating temperature range in an internal combustion engine. A pump component comprising PEI, a pump component made from PP would be expected to exhibit a loss in stiffness and strength, resulting in failure, rendering such a pump component unsuitable.

PP also has a higher coefficient of thermal expansion (CTE) than PEI over the operating temperature range in an internal combustion engine. A pump component made from PP would be expected to exhibit greater dimensional variation than a pump component comprising from PEI that would result in failure unless fillers are also employed. The need for fillers to reduce CTE variation would be expected to add weight to the pump component, thereby rendering the pump component less suitable.

Comparative Example 15

Polyethylene (PE) can have a glass transition temperature (Tg) of about −120° C. and a melt temperature (Tm) of about 137° C. Therefore, a pump component made of PE would not be suitable for use in an internal combustion engine.

PE has a lower modulus than PEI over the operating temperature range in an internal combustion engine. A pump component comprising PEI, a pump component made from PE would be expected to exhibit a loss in stiffness and strength, resulting in failure, rendering such a pump component unsuitable.

PE also has a higher coefficient of thermal expansion (CTE) than PEI over the operating temperature range in an internal combustion engine. A pump component made from PE would be expected to exhibit greater dimensional variation than a pump component comprising from PEI that would result in failure unless fillers are also employed. The need for fillers to reduce CTE variation would be expected to add weight to the pump component, thereby rendering the pump component less suitable.

Comparative Example 16

Polycarbonate (PC) can have a glass transition temperature (Tg) of about 145° C. Therefore, a pump component made of PC would not be expected to be suitable for use in an internal combustion engine.

Comparative Example 17

Polysulfone (PSU) can have a glass transition temperature (Tg) of about 189° C. Therefore, a pump component made of PSU would not be expected to be suitable for use in an internal combustion engine.

Comparative Example 18

Polyethersulfone (PES) can have a glass transition temperature (Tg) of about 225° C. Therefore, a pump component made of PES might be suitable for use in an internal combustion engine.

Comparative Example 19

Polyphenylsulfone (PPSU) can have a glass transition temperature (Tg) of about 220° C. Therefore, a pump component made of PPSU might be suitable for use in an internal combustion engine.

Comparative Example 20

PPE/PS blend can have a glass transition temperature (Tg) of about 100-200° C. Therefore, a pump component made of a PPE/PS blend might be suitable for use in an internal combustion engine.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A positive displacement pump comprising at least a first component;
    wherein said first component comprises a polyetherimide component,
    wherein the polymeric component has a density ranging from more than 0 to 3 g/cm3,
    wherein the polymeric component has a glass transition temperature (Tg) greater than or equal to 150° C.,
    wherein the polymeric component has a yield strength retention greater than 90% after soaking in engine oil for 7 days at 150° C.; and,
    wherein the first component is a rotor of the positive displacement pump.

2. The pump according to claim 1, wherein the polyetherimide component has an Izod unnotched (80*10*4 at +23° C. and−30° C.) impact strength of at least 40 KJ/m$^2$, as measured according to ISO 180/1U.

3. The pump according to claim 1, wherein the polyetherimide component has a Vicat softening temp, rate B/120 of 220° C., as measured according to ISO 306.

4. The pump according to claim 1, wherein the polyetherimide component has an HDT/Ae, 1.8 MPa Edgew 120*10*4 sp=100 mm of 210° C., as measured according to ISO 75/Ae.

5. The pump according to claim 1, wherein the pump comprises a plurality of additional components, and wherein each of the plurality of additional components comprises polyetherimide.

6. The pump according to claim 5, wherein the pump consists of the first component and the plurality of additional components.

7. The pump according to claim 1, wherein the polyetherimide component comprises one selected from the group consisting of a polyetherimide copolymer, a polyetherimide terpolymer, a filled polyetherimide, an unfilled polyetherimide, a polyetherimide blend, and combinations thereof.

8. The pump according to claim 7, wherein the polyetherimide component comprises a filled polyetherimide, and wherein the polyetherimide is filled with one selected from the group consisting of carbon particles, a polyetherimide filled with metal, ceramic, glass, and combinations thereof.

9. The pump according to claim 1, wherein the polyetherimide component further comprises one selected from the group consisting of a polyphenylsulfone (PPSU), a polyether ether ketone (PEEK), a poiyphthalamide (PPA), and combinations thereof.

10. The pump according to claim 2, wherein the pump has a lower noise vibration harshness as compared to a second pump,
wherein the second pump comprises a metal rotor corresponding to the polymeric rotor comprising polyetherimide of the pump according to claim 2, and
wherein the second pump is otherwise identical to the pump according to claim 2, except for the fact that that the rotor of the second pump does not comprise polyetherimide as in the first pump, but rather comprises a metal.

11. The pump according to claim 10, wherein the lower noise vibration harshness exhibits a reduction in decibel level.

12. The pump of claim 1, wherein the ptmtp comprises at least one additional component, wherein said at least one additional component comprises a housing defining an inlet and an outlet of the positive displacement pump.

13. The pump according to claim 12, wherein the housing is also made of polyetherimide.

14. The pump of claim 1, wherein the first component is a rotor operatively positioned between an inlet and an outlet, wherein the inlet and the outlet are defined by a housing, and wherein the pinup further comprises a displacement component for displacing a liquid between the inlet and the outlet, wherein the displacing component is one selected from the group consisting of a vane, a gear, and a trachoid.

15. The pump according to claim 14, wherein the displacement component is a roller vane.

16. The, pump according to claim 14, wherein the displacement component also comprises polyetherimide.

17. The pump according to claim 1, wherein the pump is a roller vane pump.

18. The pump according to claim 1, wherein the pump is a vane pump.

19. The pump according to claim 1, wherein the pump is a gear pump.

20. The pump according to claim 1, wherein the pump is trachoid pump.

21. The pump according to claim 1, wherein the pump is optimized to minimize inner stress levels in the housing, wherein the inner stress levels range from 0 to 35 MPa.

22. The pump according to claim 21, wherein the inner stress levels in the housing are about 10 MPa.

23. The pump according to claim 21, wherein the inner stress levels in the housing are determined by a method selected from the group consisting of measuring the inner stress levels via wire-resistance-strain gages, or predicting the inner stress levels via CAE computer simulation software, and combinations thereof.

24. A method of making a positive displacement pump for pumping liquids, the pump comprising
a housing defining an inlet and an outlet,
a rotor operatively positioned between the inlet and the outlet, the pump further comprising a rotor for displacing a liquid between the inlet and the outlet,
wherein the method comprises forming at least the rotor of the pump from polyetherimide, wherein the polyetherimide has a density ranging from more than 0 to 3g/cm3, and has glass transition temperature (Tg) greater than or equal to 150° C., and has a yield strength retention greater than 90% after soaking in engine oil for 7 days at 150° C.

25. The method of claim 24, wherein the rotor is machined from a solid block of polyefnerimide.

26. The method of claim 24, wherein the rotor is injection molded from polyetherimide.

27. A positive displacement pump comprising a polyetherimide component,
wherein the polyetherimide component has a density ranging from more than 0 to 3 g/cm3,
wherein the polyetherimide component has a glass transition temperature (Tg) greater than or equal to 150° C., and
wherein the polyetherimide component has a yield strength retention greater than 90% after soaking in engine oil for 7 days at 150° C;
wherein the polyetherimide component comprises a member selected from the group of polyetherimide homopolymers, polyetherimide copolymers, and combinations thereof;
wherein the polyetherimide component is a rotor operatively positioned between an inlet and an outlet, wherein the inlet and the outlet are defined by a housing, and wherein the pump further comprises a displacement component for displacing a liquid between the inlet and the outlet, wherein the displacing component is one selected from the group consisting of a vane, a gear, and a trachoid.

28. A positive displacement pump comprising at least a first component; wherein said first component comprises a polyetherimide component,
wherein the polymeric component has a density ranging from more than 0 to 3 g/cm3, a glass transition temperature (Tg) greater than or equal to 150° C., a yield strength retention greater than 90% after soaking in engine oil for 7 days at 150° C.; has an Izod unnotched (80*10*4 at +23° C. and−30° C.) impact strength of at least 40 KJ/m$^2$, as measured according to ISO 180/1U, a Vicat softening temp, rate B/120 of 220° C., as measured according to ISO 306, an HDT/Ae, 1,8 MPa Edgew 120*10*4 sp=100 mm of 210° C., as measured according to ISO 75/Ae, and,
wherein the first component is a rotor of the positive displacement pump.

* * * * *